March 1, 1932. H T HERR 1,847,718

FUEL INJECTION SYSTEM

Filed March 12 1929   5 Sheets-Sheet 1

WITNESS
E. Lutz

INVENTOR
H.T. Herr.
BY
A. B. Reavis
ATTORNEY

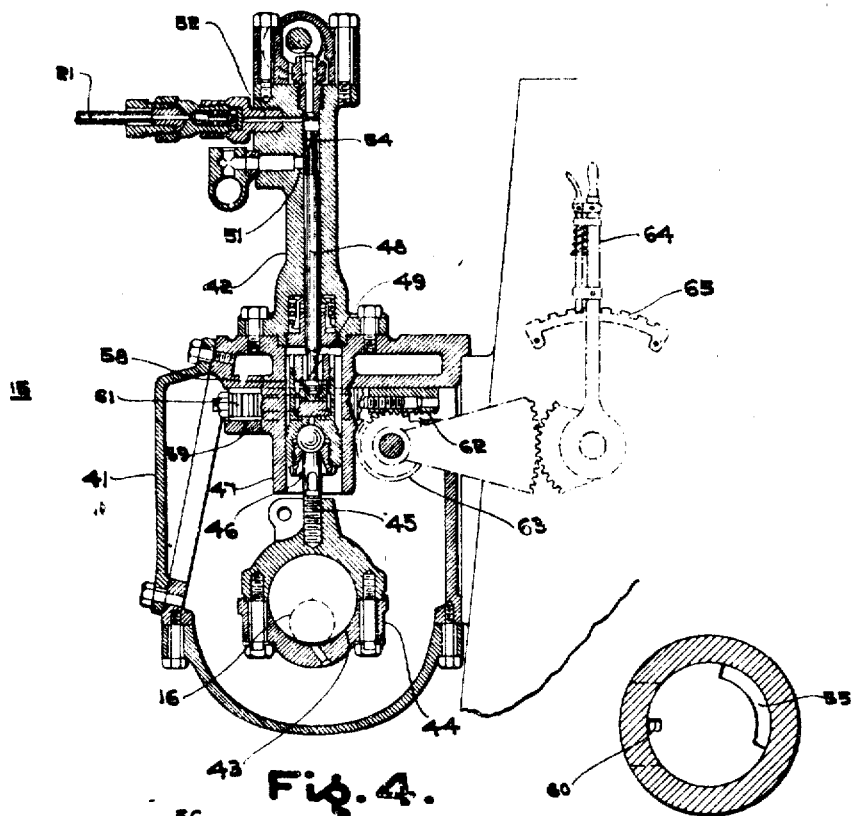

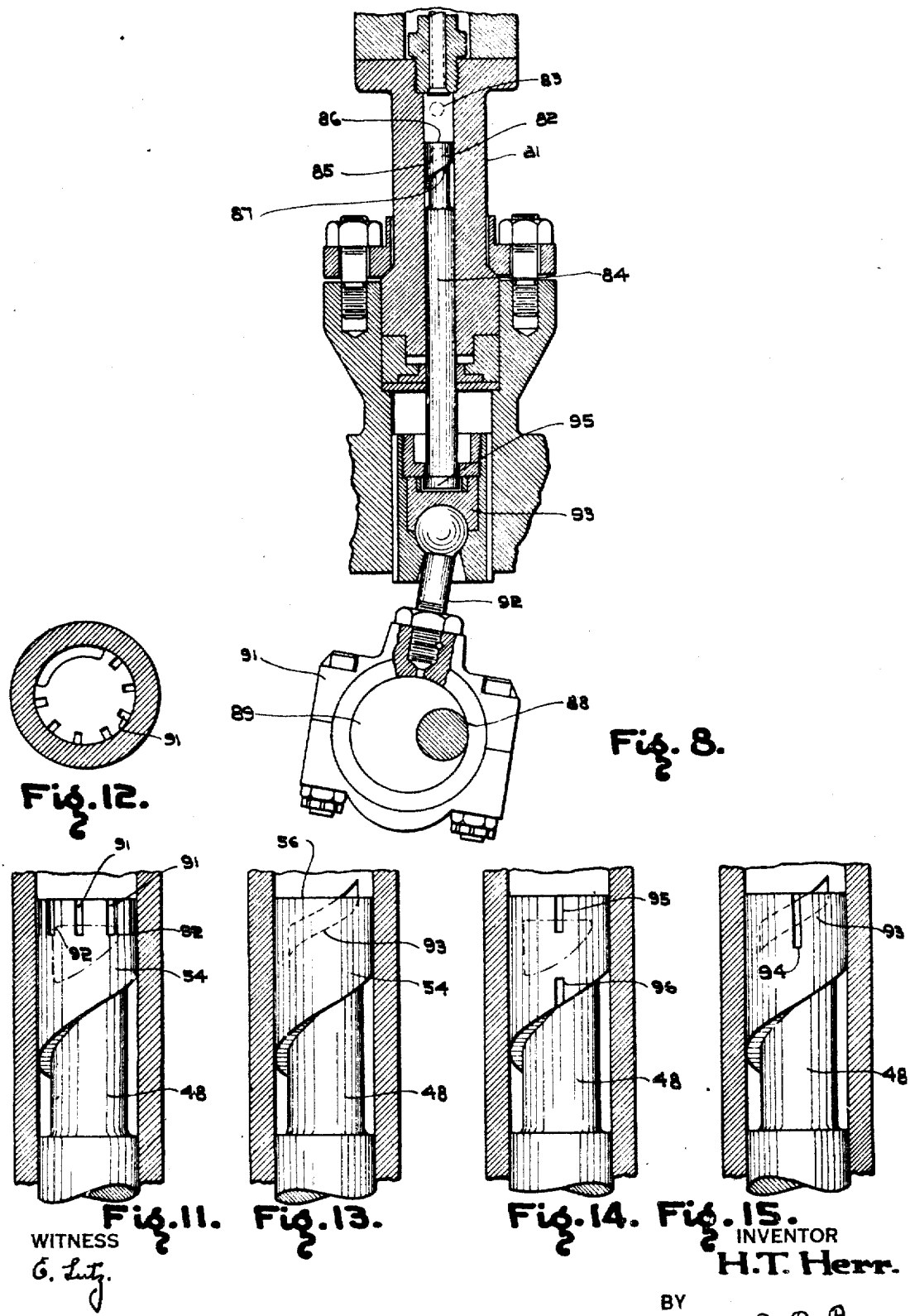

Patented Mar. 1, 1932

1,847,718

UNITED STATES PATENT OFFICE

HERBERT T. HERR, OF PHILADELPHIA, PENNSYLVANIA, ASSIGNOR TO WESTING-HOUSE ELECTRIC & MANUFACTURING COMPANY, A CORPORATION OF PENNSYL-VANIA

FUEL INJECTION SYSTEM

Application filed March 12, 1929. Serial No. 346,446.

My invention relates to fuel injection systems for internal combustion engines and particularly to fuel injection systems of the solid type, that is, fuel injection systems wherein the fuel is injected into the engine cylinder by some mechanical means such as, for example, a plunger pump, without the aid of extraneous charging medium such as compressed air, and it has for an object to provide apparatus of the character designated which shall operate reliably, effectively and very efficiently.

It has for a further object to provide apparatus of the foregoing character which shall be capable of so injecting the fuel into the engine cylinder as to obtain more desirable working pressures in the engine cylinder as well as better fuel burning during each working stroke of the engine piston.

It has for still another object to provide a fuel injection system which shall be capable of so injecting the fuel into the engine cylinder as to obtain higher mean effective pressures during each engine working stroke in order to develop a maximum amount of power in an engine cylinder consistent with its volumetric capacity.

It has for a further object to so inject the fuel that the maximum pressure in the engine cylinder may be maintained uniform for a substantial portion of the engine working stroke so as to avoid sudden fluctuations or peak pressures tending, but momentarily, to increase the engine cylinder pressure an abnormal amount. In other words, it has for an object to provide a system which shall be capable of so injecting the fuel into the engine cylinder that a constant pressure or flat indicator diagram may be produced as distinguished from a pointed or peaked indicator diagram.

It has for still another object to provide a fuel injection system which shall be capable of so injecting the fuel into the engine cylinder so as to permit the engine to operate with an increased compression pressure, a decreased maximum combustion pressure and an increased mean effective pressure in the engine cylinder.

It has for still another object to provide a fuel injection system including a pump wherein the injection of fuel into the engine cylinder shall be so coordinated with the compression pressures obtaining in the engine cylinder for different positions of the engine piston as to effect proper and uniform penetration of fuel into the engine cylinder throughout the entire injection period.

It has for still another object to provide, in a fuel system of the character designated, a fuel injection pump which shall be capable of regulating the time of fuel injection into the engine cylinder in accordance with the speed of the engine, or in accordance with the load imposed upon the engine, or in accordance with both of the aforesaid conditions.

It has for still another object to provide, in a fuel injection system of the character designated, a fuel injection pump which, although driven by a crank or eccentric or some equivalent means, and not by a cam, shall embody means for so regulating its volumetric capacity as to obtain the best possible engine efficiency and the development of the most power by the engine.

It has for still another object to provide a plunger pump driven by a crank or eccentric or some equivalent means for injecting the fuel into the engine cylinder, which pump shall have associated therewith suitable means for controlling the beginning and ending of each fuel injection period and which pump shall also have associated therewith means for so regulating or varying the rate at which the fuel is injected into the cylinder during each injection period as to obtain a very high combustion efficiency and an increase in the power output of the engine cylinder.

It has for still another object to provide a plunger pump driven by a crank or eccentric or some equivalent means for injecting the fuel into the engine cylinder, which pump shall be provided with suitable means for by-passing away from the engine cylinder a portion of the fuel displaced by the pump plunger during a portion of each working or injection stroke and which pump shall also be provided with means for properly regulating the quantity of fuel so by-passed in order that the peak combustion pressure obtaining in the engine cylinder may be reduced and the mean effective pressure obtaining in the engine cylinder increased.

These and other objects are effected by my invention, as will be apparent from the following description and claims taken in connection with the accompanying drawings, forming a part of this application, in which:

Fig. 4 is a view, in transverse section, taken on the line IV—IV of Fig. 3;

Fig. 5 is an enlarged, partial view of the fuel pump plunger and cylinder shown in Fig. 4;

Fig. 6 is a view, in transverse section, taken on the line VI—VI of Fig. 5;

Fig. 7 is a plan view of the fuel pump shown in Figs. 5 and 6;

Fig. 8 is a view, in sectional elevation, of a form of fuel pump arranged in accordance with the prior art;

Fig. 11 is a partial view, in sectional elevation, of another form of fuel pump arranged in accordance with my invention and having means embodied in the pump plunger for properly metering the fuel injected into the engine cylinder, the metering means being so arranged as to be effective for a large number of angular positions of the pump plunger;

Fig. 12 is a plan view of the fuel pump shown in Fig. 11;

Fig. 13 is a view, in sectional elevation, of another embodiment of my invention wherein the means for metering the fuel injected into the engine cylinder is embodied in the stationary portion of the fuel pump;

Fig. 14 is a partial view, in sectional elevation, of still another embodiment of my invention wherein the fuel pump is provided with means for metering the quantity of fuel injected into the engine cylinder both during the early portion as well as the final portion of the fuel injection period;

Fig. 15 is a partial view, in sectional elevation, of still another embodiment of my invention wherein the means for properly metering the fuel injected into the engine cylinder is embodied in both the stationary and moving portions of the fuel pump; and, Figs. 16 to 24, inclusive, are partial diagrammatic views, of other embodiments of my invention wherein the fuel pump is arranged to provide various timing effects with respect to the injection of fuel in the engine cycle.

Figure 1:
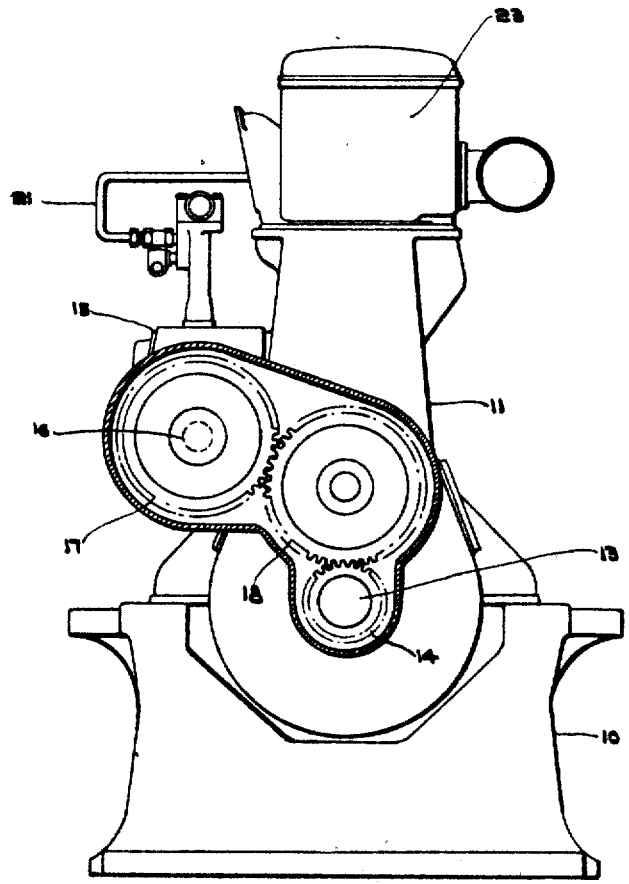
Fig. 1 is an end view, partly in section and partly in elevation, of an internal combustion engine provided with one form of fuel injection system arranged in accordance with my invention.

Referring to the drawings, I show, in Fig. 1, a form of internal combustion engine 10, preferably of the Diesel type, and embodying a housing 11 retaining a plurality of working cylinders 12. (See Fig. 2.) The engine 10 is provided with the usual form of crank shaft 13 to which is secured a fuel pump drive gear 14.

Supported upon the side of the engine housing is a fuel pump 15 having a fuel pump drive shaft 16 operatively connected to a drive gear 17. Interposed between the fuel pump drive shaft gear 17 and the gear 14 on the crank shaft is an idler gear 18, the arrangement being such that the gear pump drive shaft 16 is driven mechanically from the engine crank shaft.

As shown, the gears are preferably so proportioned that the fuel pump drive shaft 16 rotates at one-half of the speed of the engine crank shaft 13, the engine operating upon the four cycle principle. However, it will be apparent that my invention is equally applicable to engines which operate upon the two cycle principle in which case the engine crank shaft and the fuel pump drive shafts rotate at the same speed.

Figure 2:
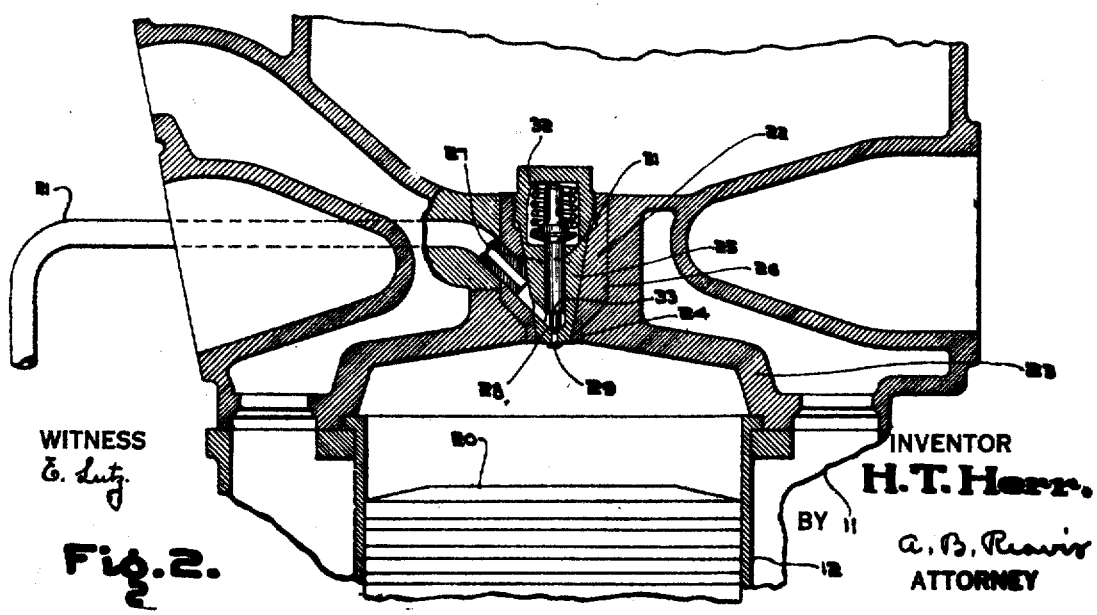
Fig. 2 is an enlarged partial view, in sectional elevation, of the cylinder construction embodied in the engine shown in Fig. 1.

The fuel pump 15 discharges fuel through a conduit 21 and injects the same into the engine working cylinder 12 through an injection nozzle 22 shown in Fig. 2. Referring now to Fig. 2, I show one form of engine cylinder and injection nozzle which may be embodied in my invention. Preferably, the cylinder 10 is provided with a removable head portion 23 provided with a central aperture 24 in which the injection nozzle 22 is secured. The arrangement is such that the fuel is sprayed or atomized into the engine cylinder, and, when ignited, acts upon the piston 20 to perform useful work. Preferably, the form of injection nozzle 22 is such as described in my copending application, Serial No. 319,983, entitled "Injection nozzle" and assigned to the Westinghouse Electric and Manufacturing Company.

Such a form of injection nozzle consists, essentially, of inner and outer body portions 25 and 26, the outer body portion 26 being secured to the fuel conduit 21 and the inner body portion 25 embodying the valve guide 27, the valve seat 28 and the tip or spray nozzle 29. Arranged in the inner body portion 25 is a valve 31, slidable in the valve guide 27, and provided with a spring 32 for biasing it to a closed position. The valve 31 is provided with a piston face 33 which is subject to the pressure in the fuel conduit 21, the arrangement being such that pressure in the fuel conduit 21 is effective to remove the valve from its seat 28 and permit injection of fuel into the engine cylinder. As soon as the pressure in the fuel conduit 21 drops, however, the spring 32 returns the valve 31 to its seat 28, and further injection of fuel or dribbling of fuel into the engine cylinder is effectively prevented.

Referring now to Fig. 4, this figure illustrates the detail construction of one form of fuel injection pump arranged in accordance with my invention. As shown, the fuel pump comprises a housing 41 having superimposed thereon a plurality of pump cylinders 42. Provided upon the fuel pump drive shaft 16 is a crank or eccentric 43 which is operatively connected through an eccentric strap 44 and a rod 45 to a cylindrical cross head 46 slidable in a cylindrical cross head guide 47. Disposed within the pump cylinder 42 is a plunger 48 connected to the cross head 46, as at 49. The cylinder 42 is provided with a fuel-admission port 51 and a fuel discharge port 52, the admission and discharge ports being located in longitudinal, spaced relation and the discharge port communicating with the fuel injection nozzle 22 through the conduit 21.

As shown particularly in Figs. 5, 6 and 7, the plunger 48 is provided at its upper end portion with a reduced diametral portion 53 having provided thereon a slide valve 54 arranged to cover and uncover the fuel-admission port 51. The slide valve 54 is so formed that, upon upward movement of the plunger 48, fuel is displaced from the cylinder 42 into the admission port 51 until such time as the slide valve 54 covers the admission port 51, whereupon the fuel in the upper end of the cylinder is trapped and is discharged at a relatively high pressure through the fuel discharge port 52.

As soon as the slide valve 54 has travelled past the fuel-admission port 51, the pressure is released in the fuel conduit 21 and the fuel is again free to pass outwardly through the admission port 51; the valve 54 being so arranged, as shown in Fig. 7, that it does not extend around the entire circumference of the plunger 48 and consequently a longitudinally-extending passageway 55 is provided which communicates with the oppositely-disposed lateral faces of the valve.

It will, therefore, be apparent that, during a portion of each working stroke of the plunger 48, the slide valve 54 closes the fuel-admission port 51 and that during the time when the latter is closed, the fuel trapped in the pump cylinder is discharged through the outlet port 52 and conduit 21 to the injection nozzle 22.

Preferably, the slide valve 54 has its lower margin or cut-off edge 57 disposed angularly with respect to the axis of the pump plunger so that the effective length of the valve 54 or, the length of time when the fuel-admission port 51 is closed by the valve 54, may be varied by angular adjustment of the plunger 48. In order to effect such adjustments, the cross head 46 is preferably provided with a plurality of circumferentially-spaced, longitudinally-extending teeth 58, Fig. 4, which teeth mesh with a transversely-extending rack 59 having teeth 61 engaging the teeth 58 of the cross head and additional teeth 62 arranged at right angles to the teeth 61 and engaging a fuel pump rack shaft 63. It will therefore be apparent that angular adjustment of the fuel pump rack shaft 63 effects angular adjustment of the cross head 46 and pump plunger 48 in order to vary the duration of the period of fuel injection. In order to effect the required angular adjustments of the fuel pump rack shaft 63, I have shown, for purposes of illustration, a control lever 64 provided with a quadrant 65 arranged in the conventional manner so that the fuel pump rack shaft 63 may be adjusted to any angular position and retained in that position.

As shown in Fig. 5, the fuel-admission port 51 may be formed in the shape of a triangle so that its upper and lower walls 51′ and 51″ substantially coincide with or are inclined at angles similar to the leading and trailing cut-off margins 56 and 57 of the valve. By having the walls of the admission port 51 coinciding with the leading and trailing cut-off margins of the valve, the beginning and termination of the fuel period may be more clearly defined. In addition, the angular position of the crank or eccentric 43 upon the fuel pump drive shaft 16 and the location of the fuel admission port 51 are so arranged that the admission port 51 is closed by the valve 54 during the intermediate or most rapid portion of the working stroke of the plunger.

Provided in the face of the slide valve 54 and extending from its leading cut-off margin is a by-pass passage or slot 60 for permitting some of the fuel which is trapped in the engine cylinder after the valve 54 has closed the admission port 51 to escape from the cylinder through the admission port. In this way, the amount of fuel discharged by the pump plunger to the conduit 21 is reduced somewhat during the early portion or beginning of the fuel injection period. However, after the slot 60 has travelled past the fuel admission port 51, the entire displacement capacity of the pump plunger is effective to inject the remaining portion of the entrapped fuel into the engine cylinder. I have found that the provision of such by-pass means assists materially in properly metering the fuel for injection into the engine cylinder as will presently be apparent.

Figure 3:
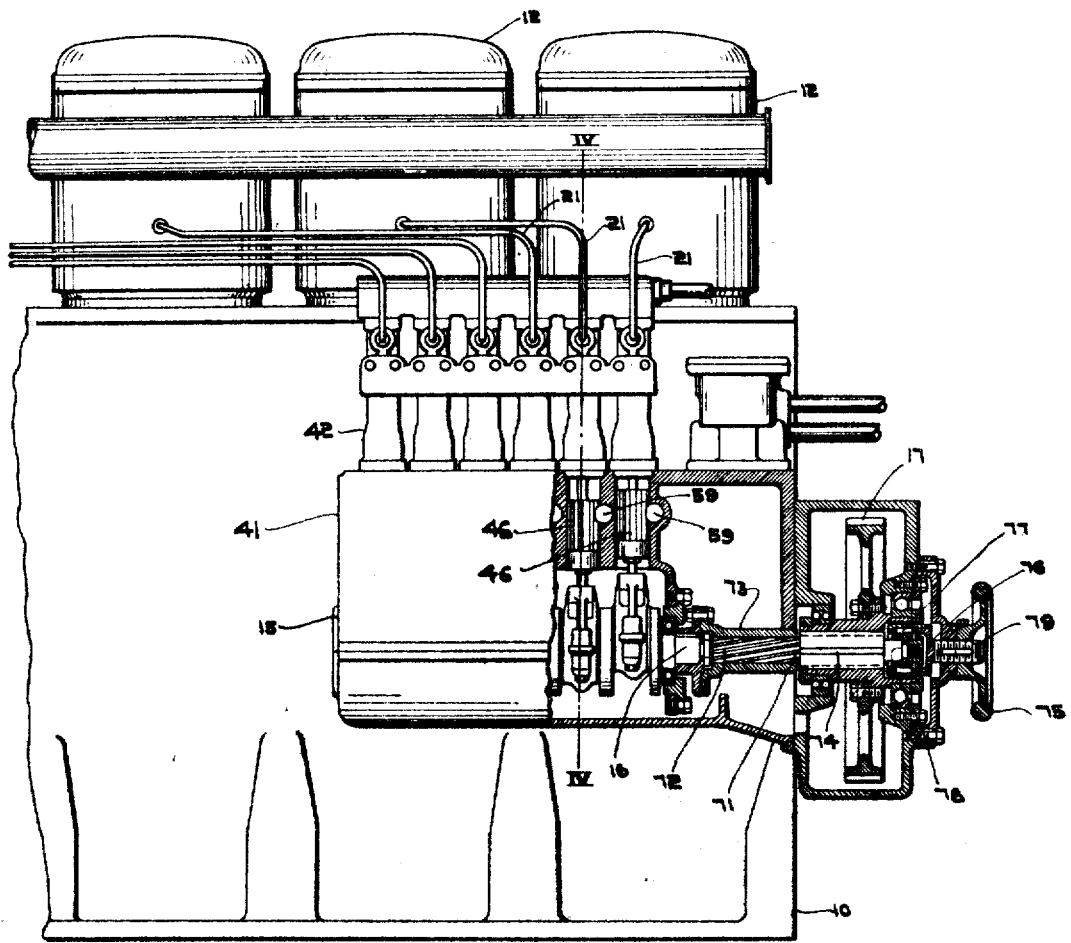
Fig. 3 is a longitudinal view, partly in section and partly in elevation, of the fuel pump shown in Fig. 1.

As shown in Fig. 3, the fuel pump 15 may comprise a plurality of the fuel pump cylinders 42 all operatively connected to the common fuel pump drive shaft 16. As illustrated, each pump cylinder supplies an individual engine working cylinder, but it is apparent that one pump cylinder may be utilized to inject fuel into a plurality of engine working cylinders, if desired. Each pump plunger cross head 46 is provided with its own adjusting rack 59, all of the adjusting racks 59 meshing with the common fuel pump rack shaft 63, (Fig. 4), so that adjustment of the lever 64 effects simultaneous and co-extensive angular adjustment of all of the pump plungers.

In order to vary the phase relation or the time of fuel injection relative to the engine crank shaft, I may associate with the fuel pump drive shaft 16 a spline shaft 71 having a plurality of teeth or projecting keys 72 which, although extending generally in an axial direction, are somewhat inclined with respect to the axis of the shaft. The teeth 72 slidably engage cooperating recesses provided in a coupling 73 secured to the fuel pump drive shaft 16. The spline shaft 71 is also provided with longitudinally-extending teeth or key members 74 slidably fitted in corresponding recesses provided in the hub portion of the fuel pump drive gear 17. The arrangement is such that, upon the spline shaft 71 being moved in an axial direction relative to both the gear 17 and the coupling 73, the latter is displaced angularly relative to the gear 17 an amount depending upon the extent of the longitudinal displacement of the spline shaft. By effecting such longitudinal adjustments of the spline shaft 71, the phase relationship of the fuel pump relative to the engine crank shaft may be varied so that the period of injection of fuel into the engine cylinders may be made relatively early or relatively late in the engine working cycle.

I have found, however, that a fuel pump provided with a slot such as shown, for example, in Figs. 5, 6 and 7, is capable, in itself, of altering the time of fuel injection for different speeds of the engine and also for different loads imposed upon the engine. With respect to a change in speed of the engine, it will be apparent that the slot 60 is capable of producing various timing effects because of the fact that the amount of fuel passing through the slot 60 will be less when the plunger 48 is reciprocated at a relatively high speed and more when the plunger 48 is reciprocated at a low speed. Inasmuch as the plunger speed is proportional to the engine speed, it will be apparent that, at high engine speeds, injection of fuel into the engine cylinder will occur earlier than at low engine speeds, an arrangement of timing that is very desirable with a variable speed engine. The slot 60 can also be proportioned so as to serve as a safety device, in which case it is so arranged that, at low engine speeds, passage of fuel through the slot is of a sufficiently large amount to prevent the engine assuming too much load. Not only is my improved form of fuel injection mechanism capable of altering the timing in response to the speed of the engine, but is also capable of altering the timing in response to the load imposed upon the engine, as will presently be described. In some engines, the spline shaft may not be required for altering the timing of fuel injection, this regulation being accomplished entirely in the pump.

In order to effect the required longitudinal displacement of the spline shaft 71, I have shown, for purposes of illustration, a hand wheel 75 operatively connected to the non-rotatable portion 76 of a thrust bearing 77, the latter cooperating with a thrust collar 78 provided on and rotating with the spline shaft. The hand wheel 75 is provided with screw threads 79 so that angular adjustment of the hand wheel causes the spline shaft to be drawn either forward toward the hand wheel or moved away from the hand wheel, such adjustments being readily effected while the engine is in operation and while the drive gear 17 and the spline shaft 71 are rotating to drive the fuel pump.

While, in the present embodiment, I have shown, by way of illustration, manual means for adjusting the position of the spline shaft as well as for adjusting the position of the fuel pump rack shaft 63, nevertheless I may operatively connect both of these shafts to the engine governor in the manner disclosed and claimed in my copending application, Serial No. 333,665 entitled "Engine governor" and assigned to the Westinghouse Electric and Manufacturing Company. In accordance with the disclosure in my aforesaid copending application, both the fuel pump rack shaft 63, as well as the spline shaft 71, are automatically adjusted in response to the load imposed upon the engine and the speed-setting of the engine.

Referring now to Fig. 8, I show a form of fuel pump arranged in accordance with the prior state of the art. This fuel pump is similar to that shown in Figs. 4 to 7 in that it comprises, essentially, a cylinder 81 provided with a triangular-shaped admission port 82 and a fuel discharge port 83. Disposed within the cylinder 81 is a pump plunger 84 having provided thereon a valve 85 having inclined leading and trailing cut-off margins 86 and 87. A drive shaft 88 is provided for the fuel pump, which drive shaft has disposed thereon a crank or eccentric 89 operatively connected through an eccentric strap 91 and a rod 92 to a cross head 93. The latter is connected to the pump plunger 84, as at 95. The foregoing fuel pump is similar in all respects to the fuel pump shown in Fig. 4 with the exception that it is not provided with the by-pass slot 60. Like the fuel pump shown in Fig. 4, the fuel pump shown in Fig. 8 is driven by a crank or eccentric and the admission port 82 as well as the crank or eccentric 89 are so arranged that the valve 85 closes the admission port 82 during the intermediate or most rapid portion of the working stroke of the plunger.

I have found that fuel pumps arranged as shown in Fig. 8 and as known in the prior art are capable of producing quite good combustion and economy, a mean effective pressure in the engine cylinder of from 70 to 80 lbs. per square inch being readily obtainable. With a pump plunger of this character, I have also found that the maximum pressures which obtain in the engine working cylinder range from 700 to 1000 lbs. per square inch, depending upon the load imposed upon the engine and the time of fuel injection. In further reference to the question of mean effective pressures, it might be noted that, while higher mean effective pressures than 80 lbs. per square inch are obtainable, with a fuel pump such as shown in Fig. 8, I have found that in such cases there is generally apt to be poor combustion of some of the fuel and smoking of the engine exhaust.

It is, therefore, the purpose of my invention to provide a form of fuel injection system of the type illustrated, that is, the solid type, which shall be capable of so injecting the fuel into the engine cylinder as to increase the mean effective pressure obtainable in an engine working cylinder with good combustion and economy and at the same time to decrease the maximum pressure obtaining in the engine cylinder so that the cylinder structure may be made less rugged consistent with the power developed.

As stated heretofore, the pump plunger 84 is driven by a crank or eccentric 89, the pump plunger assuming, what may be termed, a zero speed at the upper and lower ends of its stroke and maximum speed at an intermediate portion of its stroke, the pump plunger displacement rate following closely a harmonic curve with respect to the crank angle. The practice of setting the eccentric 89 so that the pump plunger connected thereto shall be moving at its most rapid rate at such times as the fuel inlet port is closed and fuel is injected into the engine working cylinder, results in extremely rapid closing of the admission port 85 as well as instantaneous opening of the admission port 85 and termination of the period of fuel injection. Maximum displacement of the pump plunger 84 with respect to time is thus effected during the injection period. In addition, the injection period takes place while the engine piston is approaching and receding from its dead center position and while it is traveling at a relatively slow speed so that the impulsive and sudden injection of fuel into the engine cylinder at a time like this not only creates abrupt increases in pressure in the fuel pump and the fuel conduit, but also creates very high maximum or peak combustion pressures in the engine cylinder. Therefore, one of the objects of my invention is to reduce these maximum or peak combustion pressures.

It is noted that the fuel injection period may take place while the engine crank shaft is moving through an angle of from 25° to 30° and, in order to get the best results for mean effective pressure, power and combustion, it has been found necessary to inject the bulk of the fuel into the engine cylinder before the engine piston reaches dead center. This is necessary because there is a definite time lag between the displacement of the pump plunger and the opening of the injection nozzle and the burning of the fuel after it has been sprayed into the engine cylinder. This is due, (1) To the building up of the pressure in the pump cylinder 42 and the conduit 21 to a sufficient amount to raise the valve of the injection nozzle from its seat and may be said to be dependent upon the form and nature of the passageway intervening between the pump and the injection nozzle; the compressibility of the fuel; the fuel's freedom from air and other gases; the expansibility of the fuel pump cylinder, piping, piping connections and the injection nozzle; and the leakage occuring in both the injection nozzle and the fuel injection pump;

(2) The lag in the burning of the fuel when injection does take place and which may be said to be dependent upon many conditions within the engine cylinder and the injection valve, the pressure at which fuel injection takes place, the size of the injection nozzle opening, the form of spray created by the injection nozzle, and the ability of the fuel in the engine cylinder to gasify and burn, the latter involving the mixture of the fuel with the air as well as the efficiency of the combustion process itself.

It is, however, a practical disadvantage in any injection system to effect a burning process which produces an expansion at or near the dead center position of the engine piston and especially so if the quantity of fuel injected at that time is large because it will naturally increase the maximum pressure to which the combustion chamber is subjected, resulting in excessive strains on the mechanical parts of the engine. It is desirable, therefore, to control the fuel injection in such a way as to limit to a definite amount the maximum pressure which may take place in the engine cylinder and yet, at the same time, burn the fuel efficiently and in such time as to give the lowest maximum cylinder pressure and the highest mean effective pressures consistent with good economy.

The foregoing may best be illustrated by reference to the indicator diagram shown in Fig. 9 wherein the compression of the air in the engine working cylinder may be indicated by the approximate adiabatic curve $ab$, which curve would continue if no fuel were injected. In order, however, to burn the fuel, it is necessary to inject the fuel at a point approximately located at $b$ so that the portion of the curve from $b$ to $c$ will reach a higher value at $c$ than if no fuel were injected before the engine working piston reaches dead center. As the combustion process goes on, and a relatively large quantity of fuel is available for burning in the combustion space of the engine cylinder, there is created a very substantial rise in pressure due to the small volume of the compression space in the engine working cylinder and the large amount of heat liberated by the burning of the fuel so that the pressure rises from $c$ to $d$. Thereafter, either the burning of the fuel is more rapid or there is not sufficient air left in the engine cylinder to furnish oxygen for complete combustion so that the pressure falls from $d$ to $e$, notwithstanding the fact that all of the fuel is not burned before point $e$ is reached, as combustion of all of the fuel may be completed at almost any point along the expansion curve from $d$ to $a$. The indicator diagram shown in Fig. 9 may be referred to as a pointed or peaked diagram and may be said to be representative of the results produced by a fuel pump of the type shown in Fig. 8. As is apparent from inspection of Fig. 9, the difficulty with such a form of diagram is that the maximum or peak pressure is not only abnormally high but it is maintained for only an instant and consequently the mean effective pressure is not as high as it might be.

The foregoing difficulties may be said to be caused by the utilization of a fuel pump which is driven by a crank or eccentric, such as 89, or any other means whereby the pump plunger displacement follows closely a harmonic curve. In order to remedy this trouble, it has, therefore, been proposed to drive the fuel pump plunger by a cam instead of a crank or eccentric, the cam being so formed that at various crank angles the displacement of the fuel pump is varied and consequently the amount of fuel injected into the engine cylinder is so metered or proportioned as to give improved combustion results over that shown diagrammatically in Fig. 9. A cam driven fuel injection pump is, however, not as desirable as one driven by an eccentric or a crank in that not only is it very costly to manufacture and more difficult to construct, but it is more subject to wear and inertia forces. The latter difficulties are especially pronounced with engines of the high speed type.

I have therefore conceived the idea of providing, in the pump plunger, the by-pass passage 60, such as shown in Figs. 5 to 7, in order that a reduced quantity of fuel may be injected into the engine cylinder during the early portion or beginning of the fuel injection period and a greater quantity during the subsequent portion of the fuel injection period. In this way, the fuel is so metered that the tendency towards high maximum initial working pressures in the engine cylinder is avoided and the gradually increasing quantity of fuel injected has a tendency to maintain the maximum cylinder working pressure for a substantial period of time so that the mean effective pressure is increased and the rate of fuel injection and combustion can be controlled in any manner desired by the proper proportioning of the pump plunger and contour of the slot or slots.

Figure 9:
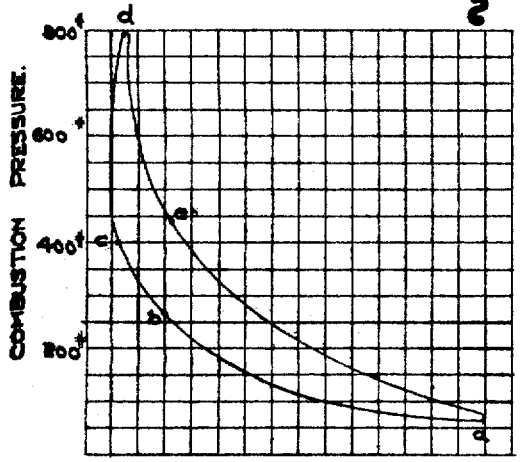
Fig. 9 is an engine cylinder indicator diagram and is representative of the conditions obtaining in an engine cylinder when a fuel pump of the type shown in Fig. 8 is employed.
Figure 10:
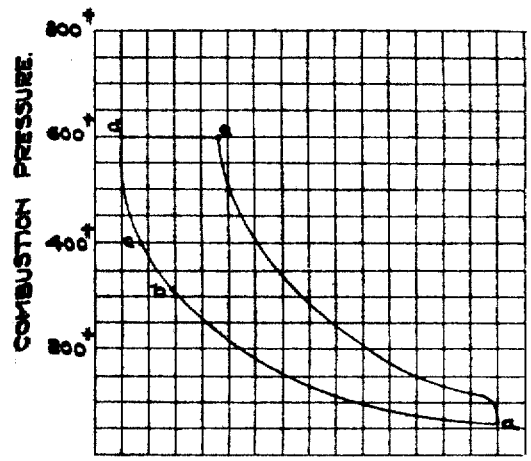
Fig. 10 is an engine cylinder diagram drawn to the same scale as Fig. 9 and is representative of the conditions which may be obtained in an engine cylinder by proper injection and distribution of fuel therein.

Referring now to Fig. 10, I show a theoretical indicator card drawn to the same scale as Fig. 9 and illustrating the form of combustion which it might be possible to obtain in an engine working cylinder in which the injection of fuel into the engine cylinder is properly controlled or metered. In order to approach such results, I propose to control the injection of fuel so that a relatively small quantity only is injected and burned between the point of fuel injection $b$ and the point $d$ so that at the point $d$ the maximum working pressure is only approximately 600 lbs. per square inch in comparison with the indicator card shown in Fig. 9 wherein the pressure at $d$ is approximately 800 lbs. per square inch. The point $d$ is the point at or near the dead center of the engine piston and as the engine piston recedes on its downward or working stroke, sufficient additional fuel is injected in the engine cylinder to maintain the maximum pressure substantially constant to the point $e$, at which point complete combustion has taken place and the gases thereafter expand adiabatically from $e$ to $a$. In other words, the amount of fuel injected into the engine cylinder at the beginning of the injection period and at a time when the engine working piston is approaching its dead center position, is so limited that the creation of the high peak pressure, shown in Fig. 9, is avoided. However, thereafter the supply of fuel injected into the engine cylinder is augmented and is so controlled that the maximum working pressure is maintained for a substantial period of time. In this way, the maximum pressure obtainable in the engine working cylinder can be controlled within limits depending upon the compression pressure.

It will be noted that the maximum working pressure is relatively low as compared with the indicator card shown in Fig. 9 so that more work can be produced in an engine cylinder of a given structural strength or, conversely, the cylinder structure may be made relatively lighter in weight for the power developed. In addition, the mean effective pressure is substantially increased so that more power can be produced in an engine of a given cylinder displacement.

This type of diagram shown in Fig. 10 may be referred to as the flat or constant pressure type and in order to produce such results, complete control of the injection of fuel and its burning must be obtained. In order, therefore, to approach these ideal conditions, I have devised the form of fuel pump shown in Fig. 4 and in detail in Figs. 5 to 7, which form of fuel pump is provided with means, such as the slot 60, coacting with the pump plunger for so regulating the volumetric capacity of the pump during each fuel injection period as to properly control the rate of fuel delivery during the entire injection period. In addition, by providing the slot 60, proper and uniform penetration of fuel into the engine cylinder throughout the entire injection period may be obtained, the slot being capable of altering the fuel injection pressure in coordination with the engine cylinder compression pressure to obtain such a result.

Referring again to these figures, it will be seen that as the pump plunger 48 moves upwardly upon its working stroke, fuel, which has been previously supplied to the pump cylinder through the admission port 51 in a manner well understood in the art, is displaced outwardly through the fuel admission port 51. Displacement of the fuel through the admission port 51 continues until such time as the leading cut-off margin 56 of the valve 54 closes off or laps the admission port 51 at which time the fuel is entrapped in the upper end of the pump cylinder. However, by providing the by-pass passage or port 60 in the valve face, it will be seen that some of the entrapped fuel is still permitted to escape through the fuel admission port 51. This escape of fuel will continue until such time as the passage 60 ends its communication with the admission port 51, after which, during the remaining portion of the fuel injection period, the full volumetric capacity of the plunger is effective for injecting fuel into the engine cylinder. Now, if the groove has its bottom surface 60' formed in the manner illustrated in Fig. 6, it will be apparent that a graduated leak-off opening will be maintained from the time the leading cut-off margin of the valve laps the admission port until such time as the passage 60 is placed out of communication with the admission port. It will, therefore, be apparent that by properly shaping the passage 60, the flow-area intervening between the pump cylinder and the admission port may be so varied that proper metering or regulation of the displacement of fuel into the engine cylinder may be effected.

Injection of fuel into the engine cylinder continues until such time as the trailing cut-off margin 57 passes above the lower wall of the admission port 51 at which time the pressure in the fuel conduit 21 drops and the fuel remaining in the pump cylinder is again permitted to escape through the admission port 51. Upon the return or non-working stroke of the plunger, the pump cylinder is again filled with fuel in a manner well understood in the art and the cycle of operation may be repeated.

From the foregoing, it will be apparent that I have provided a form of fuel injection pump which, although driven by a crank or eccentric or some equivalent means having a harmonic-like displacement characteristic, is capable of injecting a lesser quantity of fuel into the engine cylinder at the beginning of the injection period and is also capable of thereafter controlling the rate of injection so that the creation of abnormally high working pressures in the working cylinder is avoided and the injection of fuel is so regulated that the maximum working pressure is maintained for a substantial period of time. By properly proportioning the by-pass passage 60, a condition within the engine cylinder may be obtained which approaches that diagrammatically shown in Fig. 10.

With further reference to the fuel pump shown in Figs. 4 and 5 to 7, it has been assumed that the eccentric or crank 43 driving the pump plunger is so arranged that the valve 54 laps the admission port 51 during the intermediate or most rapid portion of the working stroke of the plunger. It has been pointed out that the rate of displacement of a plunger pump driven by a uniformly rotating crank or eccentric may be said to follow a harmonic curve and also that the passage 60 is relied upon for providing the proper metering of the fuel. However, it is to be understood that I may arrange the crank or eccentric driving the fuel pump in such angular relation with respect to the admission port of the fuel pump that the variable displacement rate of the pump plunger resulting from the aforesaid harmonic characteristic may be utilized to aid or assist the passage 60 in obtaining the proper metering effect.

In the embodiment shown in Figs. 4 and 5 to 7, I show a form of pump plunger which is provided with but a single by-pass passage. However, I may, if I so desire, permit of a wider angular adjustment of the pump plunger by providing, as shown in Figs. 11 and 12, a plurality of by-pass passages 91 spaced circumferentially about a substantial portion of the pump plunger. With such an arrangement, I prefer to provide substantial radii, 92, in the corners of the admission port, which radii are so proportioned that, irrespective of the angular position of the pump plunger, the proper amount of entrapped fuel is permitted to escape through the admission port once the latter has been lapped by the valve. The by-pass passages 91 and the radii 92 are so arranged that, as the pump plunger is adjusted angularly, succeeding passages 91 come into more and more and finally full registry with the fuel admission port while corresponding passages 91 gradually pass out of registry with the fuel admission port, the total flow-area of all of the passages 91 in registry with the fuel inlet port at any one time, or for any angular position of the pump plunger, being such as to produce the required metering effect.

While in the previous embodiments I have provided means in the valve of the pump plunger for obtaining the required metering effect, nevertheless, it is to be understood that it is within the purview of my invention to embody this means in the stationary portion of the fuel pump, for example, in the pump cylinder. Referring now to Fig. 13, this shows a form of admission port 93 which is preferably formed in the manner illustrated so that the valve 54, instead of instantaneously closing the admission port 93, closes it gradually. In other words, the leading cut-off margin 56 is not inclined or disposed parallel with the walls of the admission port and hence there is a gradual closing of the admission port 93.

With a fuel pump of the character shown in Fig. 13, admission of fuel into the engine cylinder commences as soon as the valve 54 has lapped the admission port 93 sufficiently so that the area of the fuel admission port which remains in communication with the interior of the cylinder is insufficient to permit all of the fuel to escape which is displaced by the pump plunger. As a consequence, some of the fuel is discharged into the engine cylinder and the remaining portion escapes through the open portion of the fuel admission port. As the plunger moves forward on its working stroke, the open portion of the fuel admission port is gradually reduced and consequently, the rate of fuel injected in the engine cylinder is proportionally increased until such time as the fuel admission port is completely lapped whereupon the entire volumetric capacity of the pump plunger is effective to inject fuel into the engine cylinder. It will therefore be apparent that, by properly shaping the fuel admission port, the proper disposition of fuel into the engine cylinder may be effected.

Under some conditions of operation, it has been found that it is not only advisable to properly meter the fuel at the beginning of the period of injection but also at the termination of the period of fuel injection and hence, in Fig. 14, I show a form of fuel pump plunger having a by-pass passage 95 associated with the leading cut-off margin and a by-pass passage 96 associated with the trailing cut-off margin. In this way, both the beginning and termination of the fuel injection period may be properly metered.

Referring now to Fig. 15, this shows a form of fuel pump having an admission port form 93 which is similar to that shown in Fig. 13. However, in the fuel pump shown in Fig. 15, I have provided a by-pass passage 94, which by-pass passage is arranged to cooperate with the fuel admission port 93 in order to secure the proper metering effect. It will, therefore, be apparent that I may embody means in both the moving and stationary portions of the fuel pump in order to accomplish the objects of my invention.

In the foregoing embodiments of my invention, the by-pass passage or slot has been generally associated with the leading or trailing cut-off margins of the slide valve provided on the pump plunger and hence the regulation or metering of the fuel injected into the engine cylinder is effected during the early or late portions of the injection period. However, it will be obvious that it is also within the purview of my invention to so arrange or proportion the by-pass passage or slot that the regulating or metering effect takes place during an intermediate portion of the injection period.

In Figs. 5, 6 and 7, the by-pass passage or slot 60 serves to modify injection as hereinbefore pointed out. The only factor affecting this modification is that of speed. With an increase in speed, less liquid is by-passed and an advancing effect is obtained and vice versa.

Figure 16:
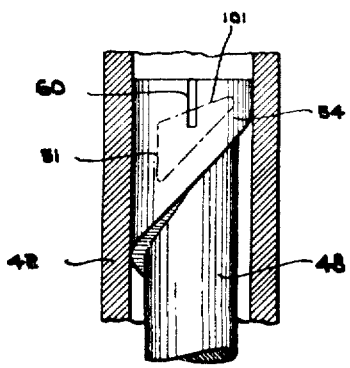
Figure 17:
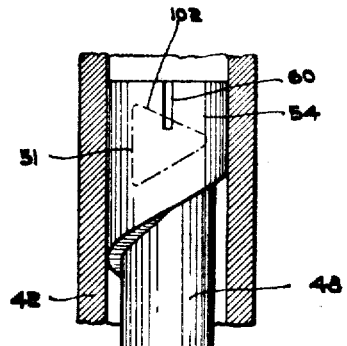

If desired, the plunger and the port may be so designed that timing effects may be secured independently of speed but, of course, modified by the latter as just pointed out. For example, it may be desirable, at full load, where maximum lap of the slide valve occurs, that an advancing effect be secured and vice versa. Then again, it may be desirable in some cases to have a retarding effect at full load and an advancing effect at light load. In Figs. 16 and 17, I show top edges 101 and 102 of the ports 51 inclined in opposite directions. In Fig. 16, increase of lap results in increased effective length of the slot and vice versa. In Fig. 17 contrary effects are produced. In Fig. 16, the by-pass exercises an increasing retarding effect with increases in load and vice versa. The contrary is true with respect to Fig. 17.

Figure 18:
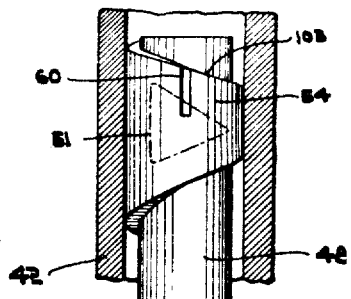

As shown in Fig. 18, the top of the plunger 103 may be inclined so as to provide for advancing the beginning of injection in the cycle with increasing loads and with increasing injection portions of the cycle. If the top edge of the port is arranged as shown, the slot 60 is decreasingly effective with increases in the cycle injection portion, or increases in the cycle injection portion, and vice versa. In other words, the slot gives an advancing effect with increasing load and vice versa.

Various other arrangements may be provided, it being remembered that, in addition to the timing effect provided by changes in speed, timing effects may be secured by design of the plunger and port.

Figure 19:
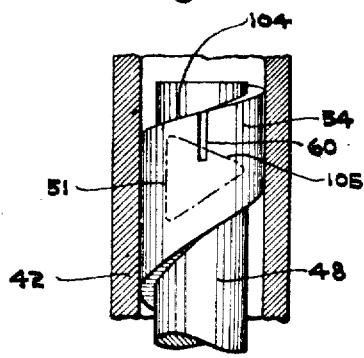

Referring now to Fig. 19, this shows an arrangement of plunger and port wherein the top edge 104 of the valve 54 is so inclined as to provide for retarding the beginning of injection in the cycle with increase in loads and the top edge 105 of the port 51 is so inclined that the by-pass or slot is decreasingly effective with increases in load and vice versa.

Figure 20:
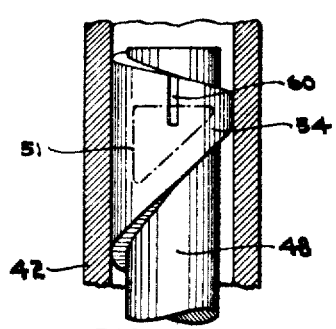

In Fig. 20, the plunger is arranged to advance the beginning of injection in the cycle with increase in loads and the by-pass or slot is increasingly effective with increases in load and vice versa.

Figure 21:
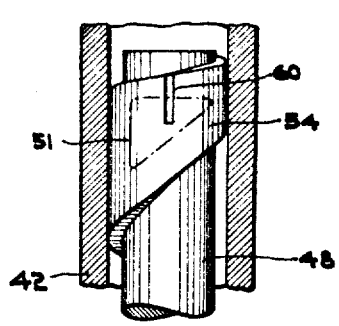

In Fig. 21, the plunger is arranged to retard the beginning of injection in the cycle with increase in loads and the by-pass or slot is decreasingly effective with increases in load and vice versa.

Figure 22:
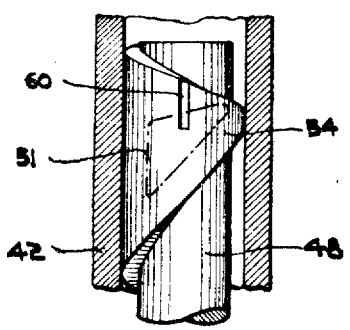

In Fig. 22, the plunger is arranged to advance the beginning of injection in the cycle with increase in loads and the by-pass or slot is increasingly effective with increases in load and vice versa.

Figure 23:
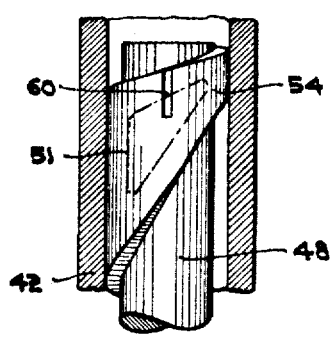

In Fig. 23, the plunger is arranged to retard the beginning of injection in the cycle with increase in loads and the by-pass or slot is increasingly effective with increases in load and vice versa.

Figure 24:
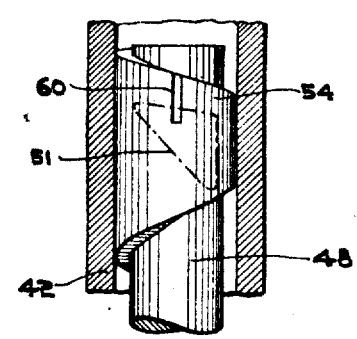

In Fig. 24, the plunger is arranged to advance the beginning of injection in the cycle with increase in loads and the by-pass or slot is increasingly effective with increases in load and vice versa.

The foregoing embodiments of my invention are given as examples of various timing effects which may be obtained with my improved system. It will be apparent that various other timing effects may be produced, if desired.

In view of the foregoing, it will be obvious that I have devised a form of fuel injection pump wherein the time or phase relation of the fuel injection period may be regulated, the duration of the period of fuel injection may be readily controlled and wherein the flow of fuel into the engine cylinder during each injection period may be properly governed or regulated. These three features cooperate to inject the fuel into the engine cylinder in such a manner as to insure the best operating efficiency obtainable.

While I have shown a form of fuel pump wherein a valve for controlling the starting and stopping of the fuel injection periods is provided directly on the plunger, nevertheless it is obvious that my invention is also applicable to fuel injection pumps wherein the aforesaid valve is made separate from the pump plunger or to fuel injection pumps of other types wherein the plunger itself controls the starting and stopping of the fuel injection periods or only the starting of the fuel injection periods. Furthermore, while in the foregoing embodiments, I have applied my invention to a form of fuel pump having a constant stroke, nevertheless my invention is also applicable to pumps wherein the stroke is varied.

While I have shown my invention in several forms, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. In a fuel injection system for an internal combustion engine, the combination of a fuel injection pump embodying a cylinder and a plunger, means for actuating the pump plunger in timed relation with the engine, fuel inlet and outlet means provided in the pump cylinder, slide valve means provided on the pump plunger and cooperating with said fuel inlet and outlet means for periodically injecting fuel into the engine cylinder, said slide valve being provided with a leading cut-off margin disposed normal to the axis of the plunger and a trailing cut-off margin disposed angularly with respect to the axis of the plunger and a sealing face extending between the cut-off margins, means for adjusting the plunger angularly with respect to the pump cylinder so as to vary the duration of the period of fuel injection, and passageway means provided in the sealing face of the slide valve and extending from the leading cut-off margin thereof toward the trailing cut-off margin, said passageway means connecting with said fuel inlet and outlet means during the beginning of each injection period for reducing the rate of flow of fuel during the beginning of each injection period.

2. In a fuel injection system for an internal combustion engine, the combination of a fuel injection pump embodying a cylinder and a plunger, means for actuating the plunger in timed relation with the engine, slide valve means provided on the pump plunger, said slide valve means having leading and trailing cut-off margins inclined with respect to each other and a sealing face extending between the cut-off margins, means for adjusting the plunger angularly with respect to the pump cylinder so as to vary the duration of the period of fuel injection, a discharge port provided in the pump cylinder and connecting with the engine cylinder, fuel inlet and outlet means provided in the pump cylinder and cooperating with the slide valve means to control the injection of fuel into the engine cylinder, during a portion of each working stroke of the plunger, said fuel inlet and outlet means having marginal wall portions communicating with the pump cylinder and arranged substantially parallel, respectively, with the leading and trailing cut-off margins of the valve, and a slot provided in the sealing face of the valve and extending from the leading cut-off margin thereof toward the trailing cut-off margin, said slot being so positioned in the valve face as to communicate with said fuel inlet and outlet means during a position of each injection period, whereby the rate of flow of fuel during such portion of each injection period is reduced.

3. In a fuel injection system for an internal combustion engine, the combination of a fuel injection pump embodying a cylinder and a plunger, a high pressure fuel outlet port provided in the pump cylinder and communicating with the engine cylinder, a low pressure fuel port provided in the pump cylinder, valve means provided on the pump plunger, said valve means having a sealing face for restricting said low pressure fuel port during a portion of each working stroke of the plunger, whereby fuel is periodically discharged by the plunger through the high pressure outlet port to the engine cylinder, and a passage located in the sealing face of the valve for conveying fuel displaced by the plunger to the low pressure fuel port during a portion of the discharge period of the fuel through the high pressure outlet.

In testimony whereof, I have hereunto subscribed my name this 7th day of March, 1929.

HERBERT T. HERR.

ing the plunger angularly with respect to the pump cylinder so as to very the duration of the period of fuel injection, a discharge port provided in the pump cylinder and connecting with the engine cylinder, fuel inlet and outlet means provided in the pump cylinder and cooperating with the slide valve means to control the injection of fuel into the engine cylinder, during a portion of each working stroke of the plunger, said fuel inlet and outlet means having marginal wall portions communicating with the pump cylinder and arranged substantially parallel, respectively, with the leading and trailing cut-off margins of the valve, and a slot provided in the sealing face of the valve and extending from the leading cut-off margin thereof toward the trailing cut-off margin, said slot being so positioned in the valve face as to communicate with said fuel inlet and outlet means during a position of each injection period, whereby the rate of flow of fuel during such portion of each injection period is reduced.

3. In a fuel injection system for an internal combustion engine, the combination of a fuel injection pump embodying a cylinder and a plunger, a high pressure fuel outlet port provided in the pump cylinder and communicating with the engine cylinder, a low pressure fuel port provided in the pump cylinder, valve means provided on the pump plunger, said valve means having a sealing face for restricting said low pressure fuel port during a portion of each working stroke of the plunger, whereby fuel is periodically discharged by the plunger through the high pressure outlet port to the engine cylinder, and a passage located in the sealing face of the valve for conveying fuel displaced by the plunger to the low pressure fuel port during a portion of the discharge period of the fuel through the high pressure outlet.

In testimony whereof, I have hereunto subscribed my name this 7th day of March, 1929.

HERBERT T. HERR.

CERTIFICATE OF CORRECTION.

Patent No. 1,847,718.　　　　　　　　　　　　　　　Granted March 1, 1932, to

HERBERT T. HERR.

It is hereby certified that error appears in the printed specification of the above numbered patent requiring correction as follows: Page 10, line 2, claim 2, for the word "very" read vary, and same claim, line 21, for "position" read portion; and that the said Letters Patent should be read with these corrections therein that the same may conform to the record of the case in the Patent Office.

Signed and sealed this 31st day of May, A. D. 1932.

(Seal)

M. J. Moore,
Acting Commissioner of Patents.

CERTIFICATE OF CORRECTION.

Patent No. 1,847,718.                                                           Granted March 1, 1932, to

HERBERT T. HERR.

It is hereby certified that error appears in the printed specification of the above numbered patent requiring correction as follows: Page 10, line 2, claim 2, for the word "very" read vary, and same claim, line 21, for "position" read portion; and that the said Letters Patent should be read with these corrections therein that the same may conform to the record of the case in the Patent Office.

Signed and sealed this 31st day of May, A. D. 1932.

(Seal)                                                                       M. J. Moore,
Acting Commissioner of Patents.